Patented Apr. 17, 1945

2,373,717

UNITED STATES PATENT OFFICE 2,373,717

PROCESS OF PRODUCING PENTAERYTHRITOL

George Spiller, Wilmington, Del., assignor to Hercules Powder Company, Wilmington, Del., a corporation of Delaware No Drawing. Application July 21, 1942, Serial No. 451,770

10 Claims. (Cl. 260—637)

This invention relates to an improved process for the preparation of pentaerythritol. More particularly it is concerned with an improved method for recovering pentaerythritol from the crude reaction mixture of acetaldehyde and formaldehyde.

Pentaerythritol has been prepared according to different procedures described in the art by the condensation of acetaldehyde with formaldehyde in an alkaline medium. Considerable difficulty has been experienced in obtaining maximum yields of pentaerythritol due, in part, to the exacting conditions in which the reaction must be conducted, and in part to the formation of by-products during the recovery of the pentaerythritol from the reaction mixture. In the precipitation of the excess and combined alkaline material used, any free aldehydes present undergo reaction with the pentaerythritol to form cyclic acetals. These acetals not only reduce the yield of pentaerythritol, but also inhibit crystallization.

Now in accordance with this invention, a method has been found of recovering high yields of ash-free, colorless pentaerythritol from the crude pentaerythritol reaction solution resulting from condensation of acetaldehyde with formaldehyde in the presence of an alkaline earth alkali condensing agent without the necessity of decolorizing the reaction mixture. The improved method involves precipitating the alkaline earth metal from the reaction mixture with ammonium carbonate, thus preventing the formation of cyclic acetals which inhibit crystallization and reduce the yield. Thus, in carrying out this process, ammonium carbonate is added to the crude reaction mixture after the reaction period is complete and the insoluble alkaline earth metal is precipitated as the carbonate and removed from the mixture. The resulting reaction mixture is water-white and yields ash-free, colorless pentaerythritol.

Now having indicated in a general way the nature and purposes of the invention, the following examples will illustrate the invention but are not to be construed as limiting the same. In the examples, the proportions of ingredients are expressed in parts by weight.

Example 1

To 1035 parts of formalin (35% formaldehyde) and 132 parts of acetaldehyde and 2250 parts of water were added 115.5 parts of calcium hydroxide. The reaction was carried out at a temperature between 18° C. and 41° C. for a period of about 6 hours. When the reaction was complete, sufficient ammonium carbonate dissolved in water was added to the reaction mixture to combine with all the calcium and the calcium was precipitated as calcium carbonate. The reaction mixture was then filtered and the calcium carbonate washed twice with hot water. The filtrate and washings were concentrated to 15% of the original volume of the filtrate at 45° C. and 15 mm. pressure and then cooled to 15° C. By filtration, 266 parts of crystalline material were obtained. By further concentration an additional 53 parts of crystalline material were obtained. A total of 319 parts of crystalline material were obtained which when calculated as pentaerythritol was a 78.5% yield based on the acetaldehyde.

An ash-free, colorless product was obtained which, upon analysis showed:

| | Per cent |
|---|---|
| Hydroxyl content | 46.6 |
| Nitrogen (Kjeldahl) | 0.06, 0.07 |
| Ash | Nil |
| Pentaerythritol (Dibenzal method) | 83.5 |

Example 2

The same method was used as described in Example 1. The quantities of ingredients used were as follows:

| | Parts |
|---|---|
| Water | 2000 |
| Formalin (35% formaldehyde) | 1380 |
| Acetaldehyde | 176 |
| Calcium hydroxide | 152 |

In place of an aqueous ammonium carbonate solution, carbon dioxide was bubbled through the reaction mixture simultaneously with the addition of aqueous ammonia in order to precipitate the calcium as calcium carbonate. The solution was concentrated by the method described in Example 1. 430 parts of crystalline material were obtained which when calculated at pentaerythritol was a 79% yield based on the acetaldehyde.

In practicing the invention, an aqueous solution of ammonium carbonate usually is added to the reaction mixture in order to precipitate the calcium or other alkaline earth alkali as calcium carbonate. However, in place of an aqueous solution of ammonium carbonate, aqueous ammonia and carbon dioxide, as illustrated in Example 2, may be used. By such a modification, ammonium carbonate is formed in the solution.

In carrying out the process described in this invention, calcium hydroxide is preferable as the alkaline earth condensing agent. However, other alkaline earth alkalies equally operable are the hydroxides of magnesium, barium, strontium, and the like.

In the examples, a method of crystallizing pentaerythritol from the reaction mixture is described. It is not intended to limit this invention to this method only. It is equally operable with other suitable methods of recovering the pentaerythritol.

The molar formaldehyde-acetaldehyde ratio which may be used in the condensation may be from about 2.5:1 to about 10:1 and preferably about 4:1 to about 5:1. The preferred ratio of alkaline material is from about 1.0 to about 1.2 equivalents per mol of acetaldehyde, although more alkaline material may be used if desired. Any suitable manner of carrying out the condensation may be employed. It is preferred, however, to use a method which will direct the reaction to the formation of pentaerythritol and keep side reactions to an absolute minimum. The time and temperature of the reaction may vary according to the known ranges. After the reaction is substantially complete, ammonium carbonate is added to the reaction mixture according to the improved method of this invention, as heretofore more fully described, and the alkali condensing material is precipitated. The pentaerythritol may then be recovered from the solution according to the methods well known to the art.

By precipitating the alkaline condensing material from the reaction mixture with ammonium carbonate, the tendency of any free aldehydes and pentaerythritol to form cyclic acetals is eliminated. This is important because cyclic acetals not only reduce the yield of pentaerythritol that may be obtained, but also inhibit crystallization. Furthermore, by practicing the method of this invention an ash-free, colorless product can be produced without the necessity of decolorizing the reaction mixture with carbon or other adsorbent.

What I claim and desire to protect by Letters Patent is:

1. In a process of producing pentaerythritol involving condensation of acetaldehyde with formaldehyde in the presence of an alkaline earth alkali, the step which comprises adding ammonium carbonate to the reaction solution at the completion of the reaction to precipitate the alkaline earth metal in the form of its carbonate.

2. In a process of producing pentaerythritol involving condensation of acetaldehyde with formaldehyde in the presence of an alkaline earth alkali, the step which comprises adding ammonium carbonate to the reaction solution at the completion of the reaction to precipitate the alkaline earth metal in the form of its carbonate, said ammonium carbonate being formed by simultaneously adding an aqueous solution of ammonia to the reaction solution, and bubbling carbon dioxide through said reaction solution.

3. In a process of producing pentaerythritol involving condensation of acetaldehyde with formaldehyde in the presence of calcium hydroxide, the step which comprises adding ammonium carbonate to the reaction solution at the completion of the reaction to precipitate the calcium in the form of its carbonate.

4. In a process of producing pentaerythritol involving condensation of acetaldehyde with formaldehyde in the presence of barium hydroxide, the step which comprises adding ammonium carbonate to the reaction solution at the completion of the reaction to precipitate the barium in the form of its carbonate.

5. In a process of producing pentaerythritol involving condensation of acetaldehyde with formaldehyde in the presence of magnesium hydroxide, the step which comprises adding ammonium carbonate to the reaction solution at the completion of the reaction to precipitate the magnesium in the form of its carbonate.

6. In a process of producing pentaerythritol involving condensation of acetaldehyde with formaldehyde in the presence of calcium hydroxide, the step which comprises adding ammonium carbonate to the reaction solution at the completion of the reaction to precipitate the calcium in the form of its carbonate, said ammonium carbonate being formed by simultaneously adding an aqueous solution of ammonia to the reaction solution, and bubbling carbon dioxide through said reaction solution.

7. In a process of producing pentaerythritol involving condensation of acetaldehyde with formaldehyde in the presence of barium hydroxide, the step which comprises adding ammonium carbonate to the reaction solution at the completion of the reaction to precipitate the barium in the form of its carbonate, said ammonium carbonate being formed by simultaneously adding an aqueous solution of ammonia to the reaction solution, and bubbling carbon dioxide through said reaction solution.

8. In a process of producing pentaerythritol involving condensation of acetaldehyde with formaldehyde in the presence of magnesium hydroxide, the step which comprises adding ammonium carbonate to the reaction solution at the completion of the reaction to precipitate the magnesium in the form of its carbonate, said ammonium carbonate being formed by simultaneously adding an aqueous solution of ammonia to the reaction solution, and bubbling carbon dioxide through said reaction solution.

9. In a process of producing pentaerythritol involving condensation of acetaldehyde with formaldehyde in the presence of an alkaline earth alkali, the step which comprises adding ammonium carbonate to the reaction solution at the completion of the reaction to precipitate the alkaline earth metal in the form of its carbonate, said ammonium carbonate being formed in the reaction solution by the addition of materials which under the conditions of the reaction will yield ammonium carbonate.

10. In a process of producing pentaerythritol involving condensation of acetaldehyde with formaldehyde, the molar ratio of the former to the latter being between about 1:4 and about 1:5 in the presence of from about 1.0 to about 1.2 equivalents of an alkaline earth alkali per mol of acetaldehyde, the step which comprises adding ammonium carbonate to the reaction solution at the completion of the reaction to precipitate the alkaline earth metal in the form of its carbonate.

GEORGE SPILLER.